United States Patent [19]

Endo

[11] 4,319,553
[45] Mar. 16, 1982

[54] INDUCTION CONTROL SYSTEM FOR INTERNAL COMBUSTION ENGINE

[75] Inventor: Yoshinori Endo, Hamamatsu, Japan

[73] Assignee: Yamaha Hatsudoki Kabushiki Kaisha, Iwata, Japan

[21] Appl. No.: 57,096

[22] Filed: Jul. 12, 1979

[30] Foreign Application Priority Data

Jul. 14, 1978 [JP] Japan .................................. 53-85223

[51] Int. Cl.³ ........................................... F02M 13/04
[52] U.S. Cl. .................................... 123/432; 123/308; 123/59 PC; 261/41 D
[58] Field of Search ................ 123/52 M, 59 PC, 308, 123/432; 261/23 A, 41 C, 41 D

[56] References Cited

U.S. PATENT DOCUMENTS

| | | |
|---|---|---|
| 2,028,585 | 1/1936 | Blake . |
| 2,473,808 | 6/1949 | Mallory ............................. 123/552 |
| 2,647,502 | 8/1953 | Braun ............................. 261/23 A |
| 4,094,931 | 6/1978 | Karino ............................. 261/23 A |
| 4,194,474 | 3/1980 | Endo . |

FOREIGN PATENT DOCUMENTS 52-29534  3/1977  Japan .
1153559  5/1969  United Kingdom .

Primary Examiner—Ronald H. Lazarus
Attorney, Agent, or Firm—Ernest A. Beutler

[57] ABSTRACT

An internal combustion engine having a relatively large main induction system which supplies a charge to the chambers at higher loads and a relatively small auxiliary induction system that supplies the chamber charge at idle and low loads so as to improve fuel economy and exhaust emission control. A valve arrangement is incorporated for controlling the flow through the induction systems. The valve arrangement includes a manually positioned valve and a valve that is responsive of flow through the induction passages so that an increasing proportion of the charge will be supplied through the main induction system as the air flow increases. A manual override is also included so that the automatically positioned valve will be opened independently of the air flow responsive actuator when the manually operated throttle valve is suddenly opened.

11 Claims, 5 Drawing Figures

INDUCTION CONTROL SYSTEM FOR INTERNAL COMBUSTION ENGINE

BACKGROUND OF THE INVENTION

This invention relates to an induction control system for an internal combustion engine and more particularly to an improved induction system and control therefor that improves performance during transitional stages of engine operation.

Recently it has been proposed to provide an internal combustion engine with a relatively small auxiliary induction system through which the charge is supplied to the combustion chambers at idle and low loads. Such an arrangement increases the velocity of charge delivered to the chambers and the resulting turbulence improves running at low load conditions. Furthermore, both fuel economy and exhaust emission control are improved with such an arrangement. The charge requirements for the engine at higher loads are supplied primarily through a relatively large main induction system. The proportion of flow to the chambers through the main and auxiliary induction systems is controlled by means of a throttle valve arrangement.

Various arrangements have been proposed for controlling the throttle valves so as to achieve the desired flow relationship. In one form of such control, the amount of charge flowing through the main induction system is regulated by means of an automatically controlled valve. Such a valve may be responsive to the air flow though the induction system so that the valve will be opened as the air flow increases to deliver an increasing amount of the charge to the chambers through the main induction system. Although such automatic arrangements are satisfactory, certain problems may be encountered in conjunction with transient conditions. For example, under extreme acceleration the air flow may not increase at a rapid enough rate so as to effect opening of the control valve of the main induction system at a rapid enough rate.

It is, therefore, a principal object of this invention to provide an improved control device for a compound induction system of an internal combustion engine.

It is another object of this invention to provide an improved control valve arrangement for an engine having both a main and an auxiliary induction system.

SUMMARY OF THE INVENTION

This invention is adapted to be embodied in an induction system for an internal combustion engine having at least a variable volume chamberin which combustion occurs, a main induction passage for delivering a charge to the chamber and an auxiliary induction passage of smaller cross sectional area for also delivering a charge to the chamber. Throttle valve means control the proportion of flow to the chamber through the induction passages. These throttle valve means comprise a manually operated throttle valve for controlling at least a portion of the total mass flow to the chamber and a secondary throttle valve for controlling the flow through at least one of the induction passages. In accordance with this invention, means control the position of the secondary throttle valve in response to a flow condition of induction system. Linkage means are also incorporated for overriding the flow condition responsive means for opening the secondary throttle valve regardless of the flow condition when the manually operated throttle valve is opened faster than the flow condition changes.

DETAILED DESCRIPTION OF THE PREFERRED EMBODIMENT

Figure 1:
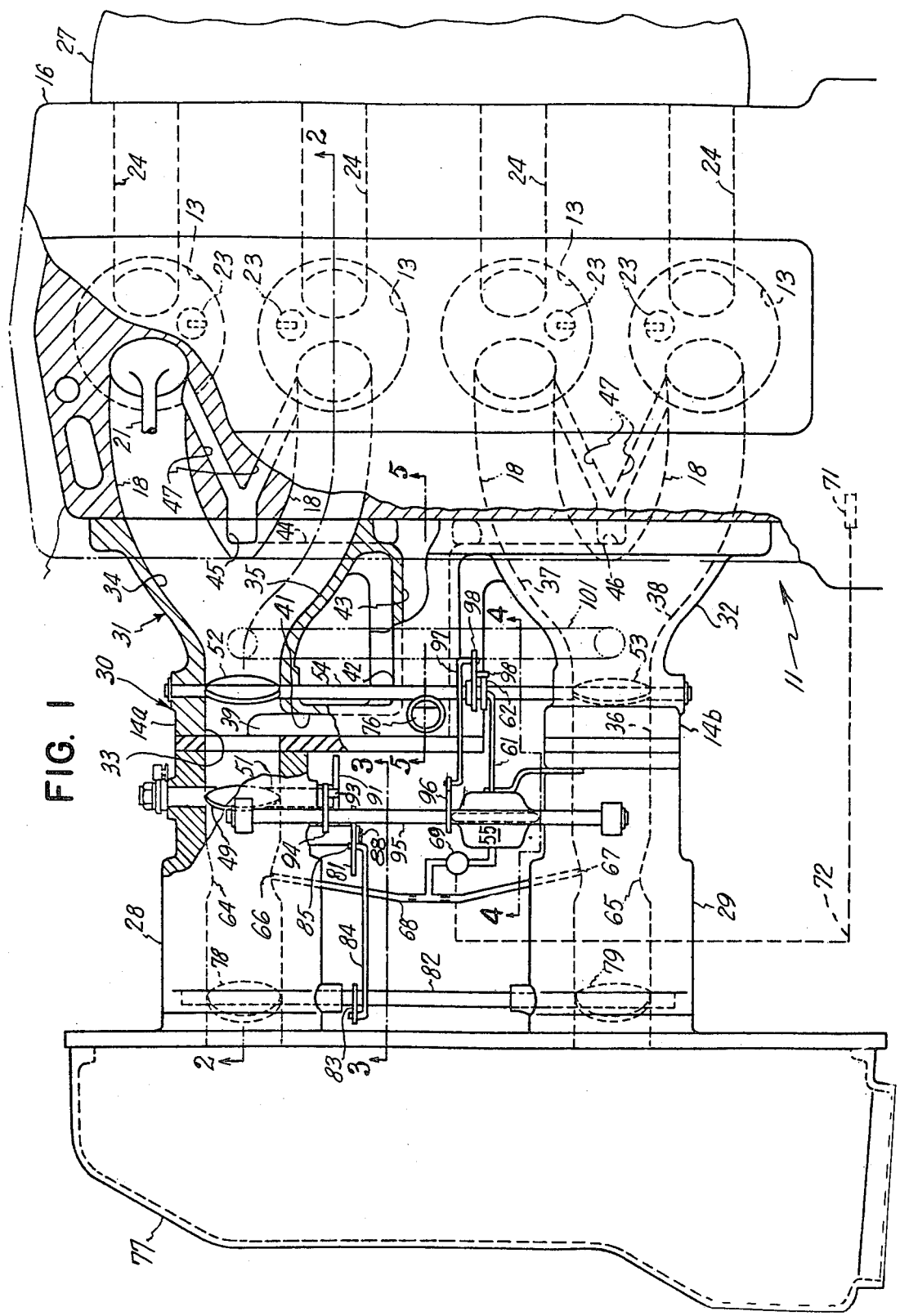
FIG. 1 is a top plan view, with portions broken away and other portions shown schematically, of an internal combustion engine embodying this invention.

The reference numeral 11 indicates generally an internal combustion engine embodying this invention. In the illustrated embodiment, the engine 11 is of the four cylinder in-line type. The invention is, however, susceptible of application to engines having other cylinder numbers or configurations as well as rotary type engines. The applications of the principal of this invention to such other types of engines is believed to be within the scope of those skilled in the art.

The engine 11 includes a cylinder block 12 in which cylinder bores 13 are formed. Pistons 14 are supported in the cylinder bores 13 and are connected to a crankshaft (not shown) by means of connecting rods 15.

A cylinder head 16 is affixed to the cylinder block 12 and has chambers 17 that cooperate with the pistons 14 and cylinder bores 13 to form chambers of variable volume in which combustion occurs. These chambers 17 will be referred to as combustion chambers. One side of the cylinder head 16 is formed with main intake passages 18, there being one such passage for each combustion chamber 17. The passages 18 terminate in main intake ports 19 and an intake valve 21 controls the flow through the ports 19. The intake valves 21 are operated in any known manner, as by means of an overhead mounted camshaft 22.

The charge in the chamber 17 is fired by means of a spark plug 23 which is positioned in each chamber 17. The spark plugs 23 are fired by any suitable device.

Exhaust passages 24 are formed in the cylinder head 16 on the side opposite the intake passages 18. Flow to the exhaust passages 24 is controlled by means of respective exhaust valves 25 that are operated in any known manner, as by means of an exhaust camshaft 26. The exhaust gases are collected in exhaust manifold 27 for discharge to the atmosphere through an appropriate exhaust system (not shown).

The engine 11 is provided with two carburetors 28 and 29 for forming a charge for the chambers 17. The carburetors 28 and 29 are substantially the same, except as hereinafter noted, and each discharge into a respective branch 31, 32 of an intake manifold, indicated generally by the reference numeral 30. The branch 31 has an inlet passage 33 and runner passages 34 and 35 that serve the main cylinder head intake passages 18 of an adjacent pair of chambers as may be readily seen from FIG. 1. In a like manner, the branch 32 has a main intake passage 36 and a pair of runner passages 37 and 38 that serve the other pair of combustion chambers.

In order to provide more efficient combustion at idle and low loads, the charge delivered to the chamber 18 under this running condition is delivered through a relatively small cross section area auxiliary induction system. As a result of the use of this system, the charge will be delivered to the chamber 17 at a high velocity so as to cause rapid flame propagation. This has the effect of increasing fuel economy as well as offering more effective control of exhaust gas constituents.

The auxiliary induction system includes an inlet opening 39 formed in the manifold branch 31 immediately adjacent its inlet 33. The opening 39 is in communication with a transversely extending passage 41 that extends to the central portion of the manifold 30 between the branches 31 and 32. The manifold 30 has an auxiliary branch 42 in which a passage 43 is formed which interesects the transverse passage 41. A recess 44 is formed in the face of the manifold 30 adjacent the cylinder head 16 and which is in communication with the passage 43. This recess 44 is sealed when the manifold 30 is secured to the cylinder head 16 so as to define a flow channel through which the induction gases may pass. Between the runners 34, 35 and 37, 38 of the manifold 30, there are a pair of upwardly extending cavities 45 and 46 formed at outlet ends of the cavity 44. The cavities 45 and 46 terminate in auxiliary intake passages 47 that extend through the cylinder head 16 and which terminate in auxiliary intake ports 48 that are positioned in the main intake passages 18 adjacent the main intake ports 19. In this manner, a charge delivered to the chamber 17 from the auxiliary induction system will flow from the auxiliary intake ports 18 through the main intake ports 19. Becuase of the close proximity of ports 48 and 19 the high velocity of the gases passing from the auxiliary induction system will not be dissipated upon entry into the chambers 17.

Figure 3:
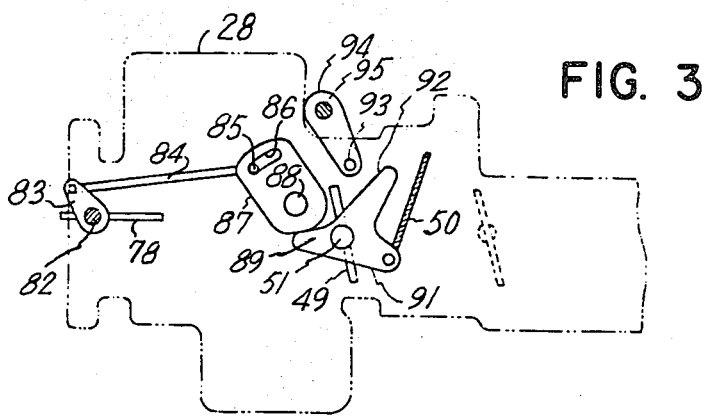
FIG. 3 is a view taken in the direction of the line 3—3 in FIG. 1 and shows a portion of the throttle mechanism.

The proportion of flow to the chamber 17 through the main and auxiliary induction systems are controlled by a valve arrangement now to be described. The valve arrangement includes a manually actuated throttle valve 49 that is positioned at the downstream end of the carburetor 28. It should be noted that since the idle and low speed charge requirements of the chambers 17 are supplied by the auxiliary induction system which is only fed by this carburetor, only the carburetor 28 need be provided with an idle and low speed fuel discharge circuit. The throttle valve 49 is rotatably journalled in the carburetor 28 on a throttle valve shaft 51 that is actuated in any known manner as by a cable 50 (FIG. 3). It should be noted that the carburetor 29 is not provided with a throttle valve corresponding to the throttle valve 49 of the carburetor 28.

Control valves 52 and 53 are positioned in the inlets 33, 36 of the manifold branches 31, 32. The control valves 52 and 53 are affixed for rotation to a common shaft 54 that is journalled in the manifold 30. When the control valves 52 and 53 are closed, no flow will be permitted to the chamber 17 through the main induction system and specifically through the passages 34, 35 and 37, 38. Rather, the flow will be directed to the chamber 17 through the auxiliary induction system consisting of the inlet 39 and passages 41, 43, 44 and 47.

Figure 4:
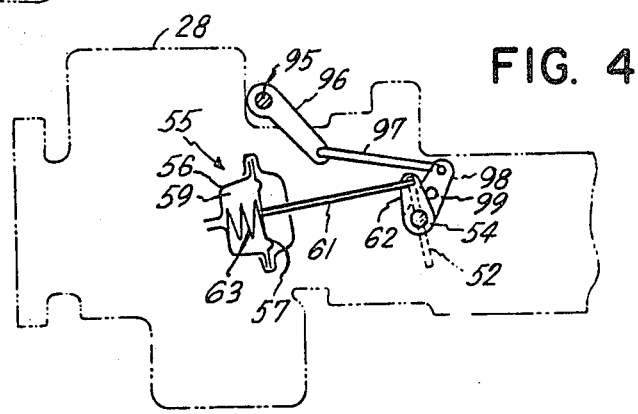
FIG. 4 is a view taken along the line 4—4 in FIG. 1 and shows another portion of the throttle mechanism.
Figure 5:
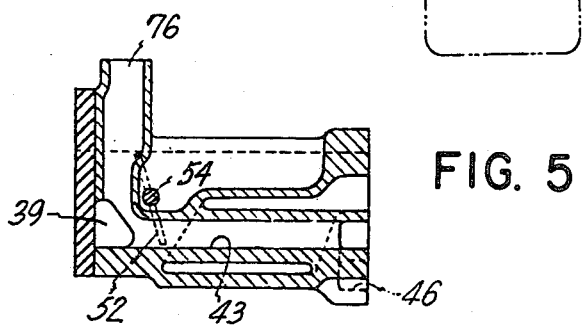
FIG. 5 is a cross sectional view taken along the line 5—5 of FIG. 1.

The position of the control valves 52 and 53 is regulated by means of a vacuum actuator, indicated generally by the reference numeral 55. The vacuum actuator 55 may best be understood by reference to FIG. 4 where it is shown in cross section. The actuator 55 includes an outer housing 56 that is divided by a diaphragm 57 into an atmospheric chamber 58 and a vacuum chamber 59. A link 61 is connected to the diaphragm 57 at one end. The other end of the link 61 is pivotly connected to a lever 62 that is affixed to the control valve shaft 54. A spring 63 is positioned in the actuator chamber 59 so as to normally urge the control valves 52 and 53 toward their fully closed position. The chamber 58 is exposed to atmospheric pressure by means of a separate atmospheric vent or by a clearance which exists between the housing 56 and the link 61. The chamber 59 is, on the other hand, subjected to a negative pressure that is responsive to the amount of air flow through the venturi sections 64 and 65 of the carburetors 28 and 29, respectively (FIG. 1). For this purpose, sensing ports 66, 67 are provided at the respective venturis 64, 65. A conduit 68 interconnects the ports 66, 67 with the actuator chamber 50 via a control valve 69. The control valve 69 is operated in response to engine temperature as determined by a sensor 71. The sensor 71 is connected to the valve 69 by means of an electrical conductor, indicated schematically at 72, so as to prevent the transmission of a vacuum signal to the chamber 59 when the temperature of the engine 11 is below a predetermined value. By having the vacuum actuator 55 sense the flow at both venturis 64 and 65 improved operation during transitional stages such as acceleration and deceleration is improved, as will become apparent.

Figure 2:
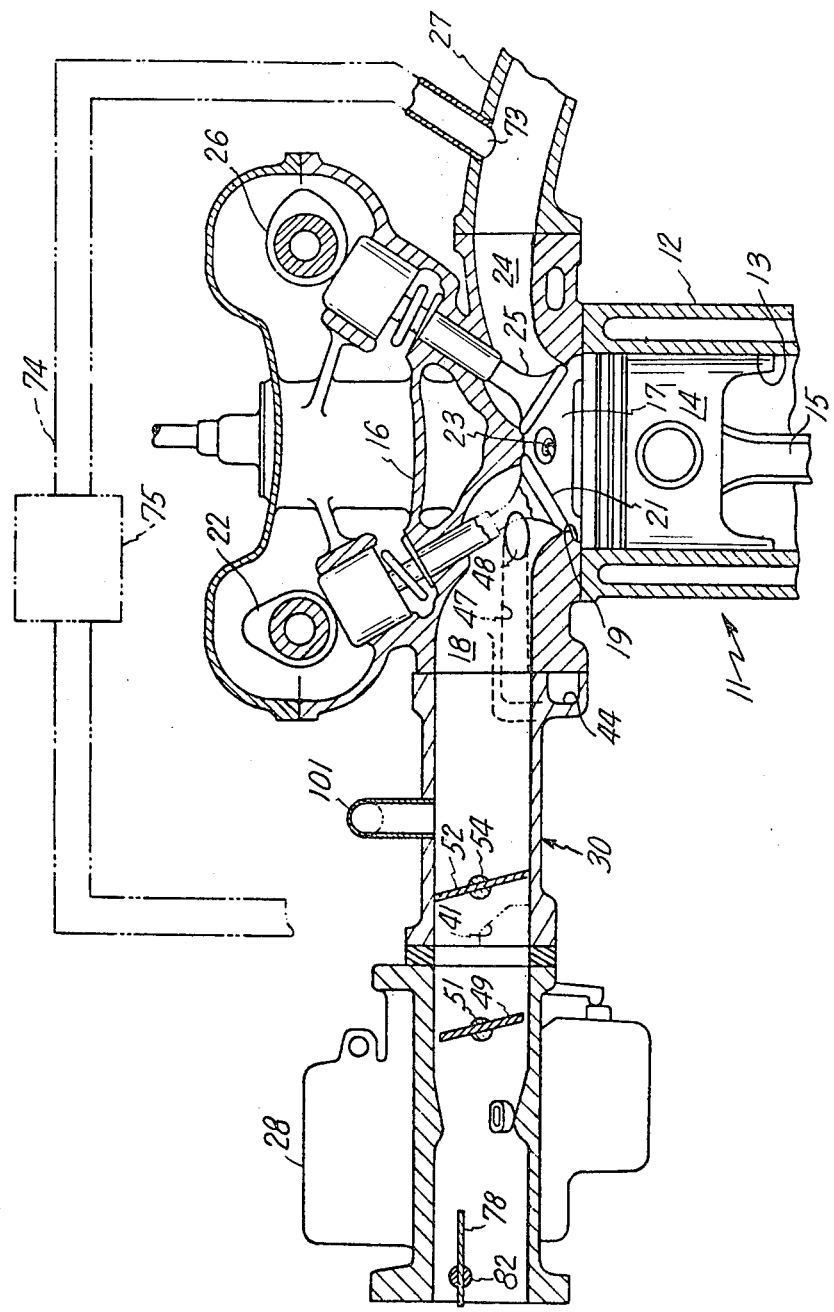
FIG. 2 is a vertical cross sectional view taken through a single cylinder of the engine shown in FIG. 1 and also illustrating certain portions of the engine in a schematic manner.

The engine 11 is provided with an exhaust gas recirculation system (EGR). This consists of an exhaust gas recirculating port 73 that is positioned in the exhaust manifold 27 (FIG. 2) which is connected by means of a conduit 74 and EGR control valve 75 of any known type to an inlet nipple 76 of the auxiliary induction system. The nipple 76 is in communication with the intersection between the passages 41 and 43 of the auxiliary induction system. Thus exhaust gases that are recirculated will be introduced into the chambers 17 at high velocity through the auxiliary induction system.

An air box, indicated generally by the reference numeral 77 is provided for introducing air to the carburetors 28 and 29. Immediately downstream of the air box and in the upstream end of the carburetor induction passages, choke valve 78 and 79 are provided for each carburetor 28, 29. The choke valves 78 and 79 are connected to a common shaft 82 so that the choke valves 78 and 79 will be rotated in unison. Any suitable device may be provided for operating the choke valves 78, 79 either automatically or manually.

A fast idle mechanism is incorporated between the choke valve shaft 82 and the throttle valve 51 so as to increase the engine idle speed when the engine is cold and the choke valves 78 and 79 are closed. This improves warm up time. The fast idle mechanism is shown in most detail in FIGS. 1 and 3 and includes a link 83 that is connected to the choke valve shaft 82 between the carburetors 28 and 29. A link 84 is pivotly connected at one end to the lever 83 and has its other end offset, as at 85. The link end 85 is received in a slot 86 of a fast idle cam 87. The fast idle cam 87 is journalled on the carburetor 28 by means of a pin 88. The cam surface of the fast idle cam 87 is adapted to coact with a arm 87 of a bell crank 91 that is affixed to the throttle valve shaft 51. When the choke valves 78 and 79 are rotated to their closed position in a clockwise direction as seen in FIG. 3, the link end 87 will traverse the slot 86 and rotate the fast idle cam 87 to a point where the bell crank 91 is rotated to open the throttle valve 49 slightly so as to increase the engine idle speed. When the choke valves 78 and 79 are opened, this fast idle condition will be removed.

As has been previously noted, the control valves 52 and 53 are opened by the vacuum actuator 55 in response to the air flow through the carburetor venturi sections 64 and 65. Under some conditions it is desirable to either provide a manual override for the degree of opening for the control valves 52 and 53 or, alternately, to delay the movement of these valves. These functions are accomplished by means of a linkage system which interrelates the movement of the throttle valve 51 to the movement of the control valves 52 and 53. This linkage system may be best understood by reference to FIGS. 1, 3 and 4.

The linkage system includes an arm 92 of the bell crank 91 that is adapted, at times, to contact a pin 93 carried at the end of a lever 94 which is affixed to a shaft 95. The shaft 95 is journalled in any appropriate manner on the bodies of the carburetors 28 and 29.

Between the carburetors 28 and 29, a lever 96 is affixed to the shaft 95. A link 97 is pivotly connected at one of its ends to one end of the lever 96. The other end of the link 97 is pivotly connected to a lever 98 which is, in turn, journalled upon the control valve shaft 54. A pin 99 is connected to the lever 98 intermediate its ends and is juxtaposed to the lever 62 which is affixed to the control valve shaft 54. A light return spring (not shown) (is connected beween the lever 98 and some fixed component of the engine 11 so as to normally bias the lever 98 to the position shown in FIG. 4.

It should be readily apparent that the linkage system which interconnects the throttle valve shaft 51 with the control valve shaft 54 incorporates a lost motion connection so that a predetermined degree of opening of the throttle valve 59 must occur before the linkage will cause opening of the control valves 52 and 53. In addition, this same lost motion will be effective to permit more rapid closure of the throttle valve 59 than the control valves 52 and 53.

The manifold branches 31 and 32 as afore described are relatively independent on each other, except such in connection as may exist between the auxiliary induction system. In order to balance pressures between these branches, a balance passage 101 is incorporated. The balance passage 101 interconnects the manifold branches adjacent and respective inlets 33, 36.

OPERATION

The drawing illustrate the condition of the engine when it is idling and fully warmed up. In this condition, the choke valves 78 and 79 will be fully opened and the sensor 71 will have operated the valve 69 so that the vacuum actuator chamber 59 will be responsive to the combined active air flow through the carburetor venturi sections 64, 65 ase sensed at the ports 66, 67. The throttle valve 51 will be positioned at its idle position and the control valve 52 and 53 will be fully closed. Thus, all intake charge flow will be supplied by the carburetor 28 and will be directed to the chambers 17 at a high velocity through the described auxiliary induction system. As has already been noted, the high velocity of charge induction will cause turbulence in the chamber 17 at the time of ignition of the spark plugs 23. This promotes rapid flame propagation and, accordingly, engine efficiency is improved.

Assuming that there is a relatively smooth transition from low speed to high speed running, the throttle valve 51 will be progressively opened. At a predetermined point, the flow through the venturi 64 will be sufficient to generate enough vacuum in the chamber 59 so as to begin to open the control valves 52 and 53. It is to be understood that the air flow through the venturi 64 must balance the fact that there is substantially no air flow through the venturi section 65. When the control valves 52 and 53 open, an increasing proportion of the flow to the chamber 17 will flow through the main induction system, which has already been described. Thus, the volumetric efficiency of the engine at high loads and high engine speeds will not be sacrificed.

The described operation has assumed that the throttle valve 49 is gradually opened to its fully opened position. If, however, the throttle valve 49 is suddenly opened, the vacuum actuator 55 and linkage interconnection between the throttle valve shaft 51 and the control valve shaft 54 will operate so as to provide smooth transition in engine operation. As has been previously noted, when the throttle valve 49 is opened the air flow through the venturi section 65 will increase so as to increase the vacuum in the chamber 59 of the actuator 55. The fact that this chamber is also exposed to generally atmospheric pressure existing in the venturi 65 will tend to dampen the change in vacuum in the chamber 59 and retard the control valves 52 and 53 from too rapid an opening. However, if the rate of the opening of the throttle valve 49 is greater than a predetermined rate, the pin 93 carried by the lever 94 will be contacted between bell crank arm 92 to rotate the shaft 95. This in turn causes the lever 96 to rotate and exert a pull on the link 94 which is transmitted to the lever 98. This force will overcome the action of the spring on the lever 98 and cause the pin 99 to engage the lever 62 and open the control valves 52 and 53. As a result, extremely rapid opening of the throttle valve 49 will cause the control valves 52 and 53 to begin to open sooner than would be possible if only the actuator 55 were employed. Thus, performance during sudden accelerations is improved.

In the event the engine is operating near wide open throttle and the throttle valve 49 is rapidly closed, the linkage system interconnecting the throttle valve shaft 51 with the control valve shaft 54 will have no effect on closing the control valves 52 and 53. Thus, the control valves 52 and 53 will be closed solely under the influence of the vacuum actuator 55 and there will be prevented abrupt closing of these valves.

When the engine is warmed and the choke valves 78 and 79 are closed, the temperature sensor 71 will maintain the valve 69 in its closed position. Thus, the control valves 52 and 53 will not be automatically opened. Thus, a greater proportion of the charge will be delivered to the chambers under cold running through the auxiliary induction system so as to improve vaporization and warm up. It should be noted, however, that the linkage system will insure opening of the control valves 52 and 53 in the event the throttle valve 59 is opened more than a predetermined degree. It should be readily apparent from the description that the combined control for the control valves 52 and 53 by means of both a mechanical linkage and a flow responsive device will insure extremely good operation during transitional phases. This result is further achieved by having the vacuum actuator 55 responsive to the pressure in both a carburetor barrel in which a throttle valve is positioned and one in which only a control valve is positioned.

In the illustrated embodiment the auxiliary induction system has its inlet exposed between the throttle valve and control valve of a single carburetor barrel. The invention, however, can be used in conjunction with arrangements wherein the auxiliary induction system has its inlet disposed in another location and wherein the flow through the auxiliary induction system is controlled by a control valve positioned directly in this system. Also, in some arrangements it may not be necessary to employ the dual vacuum source for the vacuum acuator 55 as described. That is, in some instances it may be desirable to only provide a vacuum port in the carburetor barrel in which the throttle valve is positioned. Various other changes and modifications may be made without departing from the spirit and scope of the invention as defined by the appended claims.

What is claimed is:

1. An induction system for an internal combustion engine having at least one variable volume chamber in which combustion occurs comprising a main induction passage for delivering a charge to said chamber, an auxiliary induction passage for delivering a charge to said chamber, said auxiliary induction passage having a substantially lesser cross sectional area than said main induction passage whereby a given mass flow of charge through said auxiliary induction passage will enter said chamber at a substantially greater velocity than the same mass flow through said main induction passage and throttle valve means for controlling the proportion of flow to said chamber through said induction passages, said throttle valve means comprising a manually operated throttle valve in said main induction passage for controlling at least a portion of the total mass flow to said chamber, said auxiliary induction passage having its inlet in communication with said main induction passage downstream of said manually operated throttle valve, and a secondary throttle valve in said main induction passage downstream of said auxiliary induction passage inlet for controlling the flow through at least one of said induction passages, the improvement comprising means for controlling the position of said secondary throttle valve in response to a flow condition of said induction system and means for overriding the flow condition responsive means for opening said secondary throttle valve regardless of said flow condition when said manually operated throttle valve is opened faster than the flow condition changes.

2. An induction system as set forth in claim 1 whwerein the flow condition sensed by the flow responsive means comprise the mass flow through the induction system.

3. An induction system as set forth in claim 1 further including means for disabling the flow responsive means whereby the position of the secondary throttle valve is controlled by the last named means.

4. An induction system as set forth in claim 1 wherein the means responsive to the flow condition is responsive to the flow through the main induction passage upstream of the manually operated throttle valve.

5. An induction system as set forth in claim 1 wherein the flow condition comprises the mass flow through one of the induction passages, said one induction passage having a venturi formed therein with a pressure port at said venturi for providing the flow condition signal, the means for controlling the position of the secondary throttle valve comprising a vacuum motor responsive to the vacuum signal at said port.

6. An induction system as set forth in claim 5 wherein the means for overriding the flow condition responsive comprise linkage means operatively connected to said manually operated valve and connected to the secondary throttle valve by means including a lost motion connection.

7. An induction system for an internal combustion engine having at least one variable volume chamber in which combustion occurs comprising a main induction passage for delivering a charge to said chamber, an auxiliary induction passage having a substantially lesser cross sectional area than said main induction passage whereby a given mass flow of charge through said auxiliary induction passage will enter said chamber at a substantially greater velocity than the same mass flow through said main induction passage and throttle valve means for controlling the proportion of flow to said chamber through said induction passages, said throttle valve means comprising a manually operated throttle valve for controlling at least a portion of the total mass flow to said chamber and a secondary throttle valve for controlling the flow through at least one of said induction passages, the improvement comprising means for controlling the position of said secondary throttle valve in response to the mass flow through one of said induction passages, said one induction passage having a venturi formed therein with a pressure port at said venturi for providing the flow condition signal, the means for controlling the position of the secondary throttle valve comprising a vacuum motor responsive to the vacuum signal at said port, linkage means for overriding the flow condition responsive means for opening said secondary throttle valve regardless of said flow condition when said manually operated throttle valve is opened faster than the flow condition changes comprising linkage means operatively connected to said manually operated valve and connected to the secondary throttle valve by means including a lost motion connection, and means for preventing the transmission of a signal from said venturi pressure port to said vacuum motor when the temperature of the engine is below a predetermined value.

8. An induction system for at least two chambers of an internal combustion engine, each of said chambers having a variable volume in which combustion occurs, said induction system comprising a pair of main induction passages, each of said main induction passages providing a charge to a respective one of said chambers, a pair of auxiliary induction passages, each of said auxiliary induction passages providing a charge to a respective one of said chambers, said auxiliary induction passages having a substantially lesser cross sectional area than said main induction passages whereby a given mass flow of charge through said auxiliary induction passages will enter said chambers at a significantly greater velocity than the same mass flow through said main induction passages, and throttle valve means for controlling the proportion of flow to said chamber through said induction passages, said throttle valve means comprising a manually operated throttle valve for controlling the flow through one of said main induction passages and secondary throttle valve means for controlling the flow through at least one pair of said induction passages, the improvement comprising means for controlling the position of said secondary throttle valve means in response to the flow through both of said main induction passages.

9. An induction system as set forth in claim 8 wherein the means for controlling the position of the secondary throttle valve means includes a venturi section formed on each of the main induction passages upstream of the manually operated throttle valves, a vacuum port at each of said venturi sections and conduit means interconnecting each of said vacuum ports with a vacuum motor for controlling the position of the secondary throttle valve means.

10. An induction system as set forth in claim 8 or claim 9 wherein the auxiliary induction passages have their inlet disposed in communication with the one main induction passage downstream of the manually operated throttle valve, the secondary throttle valve means comprising a pair of secondary throttle valves, each of said pair of said secondary throttle valves being positioned in a respective one of the main induction passages, the secondary throttle valve in the one main induction passage being positioned downstream of said auxiliary induction passage inlet.

11. An induction system as set forth in claim 10 further including linkage means for overriding the flow responsive means and opening the secondary throttle valve means regardless of the amount of flow when the manually operated throttle valve is opened faster than the flow velocity changes.

* * * * *